United States Patent [19]
Henriksson

[11] Patent Number: 5,575,430
[45] Date of Patent: Nov. 19, 1996

[54] OPEN-FACE FISHING REEL OF THE FIXED-SPOOL TYPE

[75] Inventor: Bengt-Ake Henriksson, Svängsta, Sweden

[73] Assignee: Abu AB, Svängsta, Sweden

[21] Appl. No.: 533,268

[22] Filed: Sep. 25, 1995

[51] Int. Cl.$^6$ .................................................. A01K 89/01
[52] U.S. Cl. ........................................................... 242/241
[58] Field of Search ..................................... 242/241, 242

[56] References Cited

U.S. PATENT DOCUMENTS

| | | | |
|---|---|---|---|
| 2,854,200 | 9/1958 | Montgomery | 242/241 |
| 4,892,267 | 1/1990 | Webb | 242/241 |
| 4,927,094 | 5/1990 | Henriksson | 242/242 |

FOREIGN PATENT DOCUMENTS

| | | | |
|---|---|---|---|
| 0054425 | 6/1982 | European Pat. Off. | 242/241 |

*Primary Examiner*—Katherine Matecki
*Attorney, Agent, or Firm*—Browdy and Neimark

[57] ABSTRACT

An open-face fishing reel of the fixed-spool type comprises a housing, a spindle element non-rotatably arranged in the housing, a handle for rotating a drive shaft, mounted in the housing, and a rotor which is rotatable by rotation of the drive shaft. A hollow line spool shaft is non-rotatably arranged on a sleeve-shaped front member of the spindle element and rotatably supports a line spool. An oscillating mechanism is arranged to impart an axial oscillating motion to the line spool as the rotor rotates. The oscillating mechanism comprises an endless screw which is rotatably mounted in the sleeve-shaped front spindle member. A gear wheel non-rotatably connected to the endless screw meshes, via a recess in the front spindle member, with a toothed element non-rotatably connected to the rotor, thereby rotating the screw as the rotor rotates. A groove-follower pin connected to the line spool shaft engages, via a longitudinal slit in the front spindle member, with the endless screw so as to move, on rotation thereof, the line spool shaft and thus the line spool back and forth along the front spindle member.

5 Claims, 2 Drawing Sheets

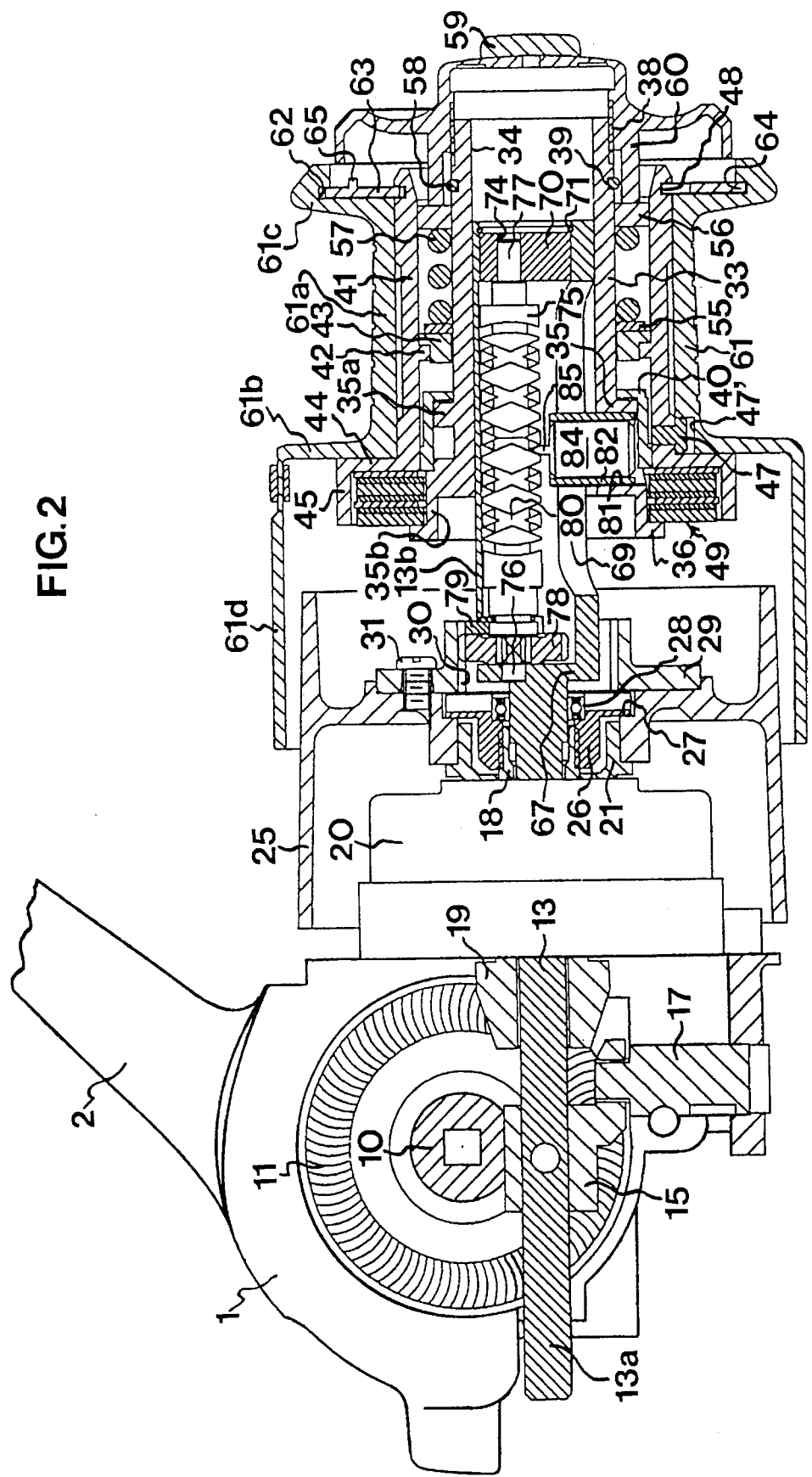

OPEN-FACE FISHING REEL OF THE FIXED-SPOOL TYPE

BACKGROUND OF THE INVENTION

The present invention relates to an open-face fishing reel of the fixed-spool type.

Prior-art fishing reels of this type (see e.g. U.S. Pat. No. 4,927,094) have a spindle which is rotatably and axially displaceably mounted in a housing and which at one end supports a line spool. The line spool is non-rotatably connected to the spindle and axially fixed thereto. A drive shaft extending perpendicularly to the spindle is mounted in the housing to be rotated by means of a handle. A pinion gear is non-rotatably arranged on the drive shaft and meshes with an oscillating gear wheel which is mounted in the housing. The oscillating gear wheel comprises an eccentric pin engaging with a driving element which is axially fixed to the spindle.

When the handle is rotated for retrieving a fishing line attached to the line spool, the drive shaft and, thus, the pinion gear rotate. The pinion gear drives the oscillating gear wheel whose eccentric pin moves the driving element back and forth in the longitudinal direction of the spindle. The driving element then oscillates the spindle and, thus, the line spool in the longitudinal direction of the spindle. The handle drives, via a gear transmission arranged in the housing, a hollow shaft which projects from the housing and which is coaxial with the spindle and through which the spindle extends. The hollow shaft then drives a rotor non-rotatably mounted thereon and supporting a bail for winding the line on the line spool.

During retrieving, the line is thus wound on the line spool which, in contrast to the rotor, does not rotate but performs an axially directed oscillating motion. As a result, the line is evenly spread over the line spool. In the construction described above, such even spreading of the line can, however, be provided only if the line spool has a relatively small width (axial extent). This is due to the line spool performing an oscillating motion, whose speed is at its maximum around the center of oscillation and decreases in the direction of the turning points of the oscillation. In practice, this difference is, however, not important when the line spool is of normal width. In some applications, it is, however, desirable to use wider line spools, which can be made shallower than line spools of smaller width and still receive the same amount of fishing line, implying that the line spool side plates can be made lower so as to not risk braking of the fishing line at the end of a long cast.

SUMMARY OF THE INVENTION

The object of the present invention is to provide an open-face fishing reel of the fixed-spool type which is of a compact design and in which the line is evenly wound on the line spool independently of the width thereof.

According to the present invention, this object is achieved by means of an open-face fishing reel of the fixed-spool type, comprising
a housing;
a spindle element having a rear spindle member which is non-rotatably mounted in the housing, and a sleeve-shaped front spindle member connected to the rear spindle member and positioned in front of the housing, said front spindle member having a longitudinal slit and a rear recess;
a hollow rotor shaft which is rotatably mounted on the rear spindle member and supports a first gear wheel nonrotatably connected to the rotor shaft;
a drive shaft mounted in the housing;
a handle for rotating the drive shaft;
a gear drive which is non-rotatably arranged on the drive shaft and meshes with the first gear wheel for rotating the rotor shaft on rotation of the drive shaft;
a rotor non-rotatably mounted on the rotor shaft and supporting a toothed element which is rotatable with the rotor shaft and the rotor;
an endless screw which is rotatably arranged in the sleeve-shaped front spindle member and supports a second gear wheel which is non-rotatably connected to the endless screw and which, via the rear recess in the front spindle member, meshes with the toothed element supported by the rotor, thereby rotating the endless screw as the rotor rotates;
a hollow line spool shaft non-rotatably arranged on the front spindle member;
a line spool rotatably mounted on the line spool shaft; and
a groove-follower pin connected to the line spool shaft and; via the slit in the front spindle member, engaging with the endless screw to move, on rotation thereof, the line spool shaft and the line spool back and forth along the front spindle member.

BRIEF DESCRIPTION OF THE DRAWINGS

The invention will now be described in more detail with reference to the accompanying drawings in which:

FIG. 2 is an axial longitudinal section of the fishing reel in FIG. 1.

DESCRIPTION OF THE PREFERRED EMBODIMENT

Figure 1:
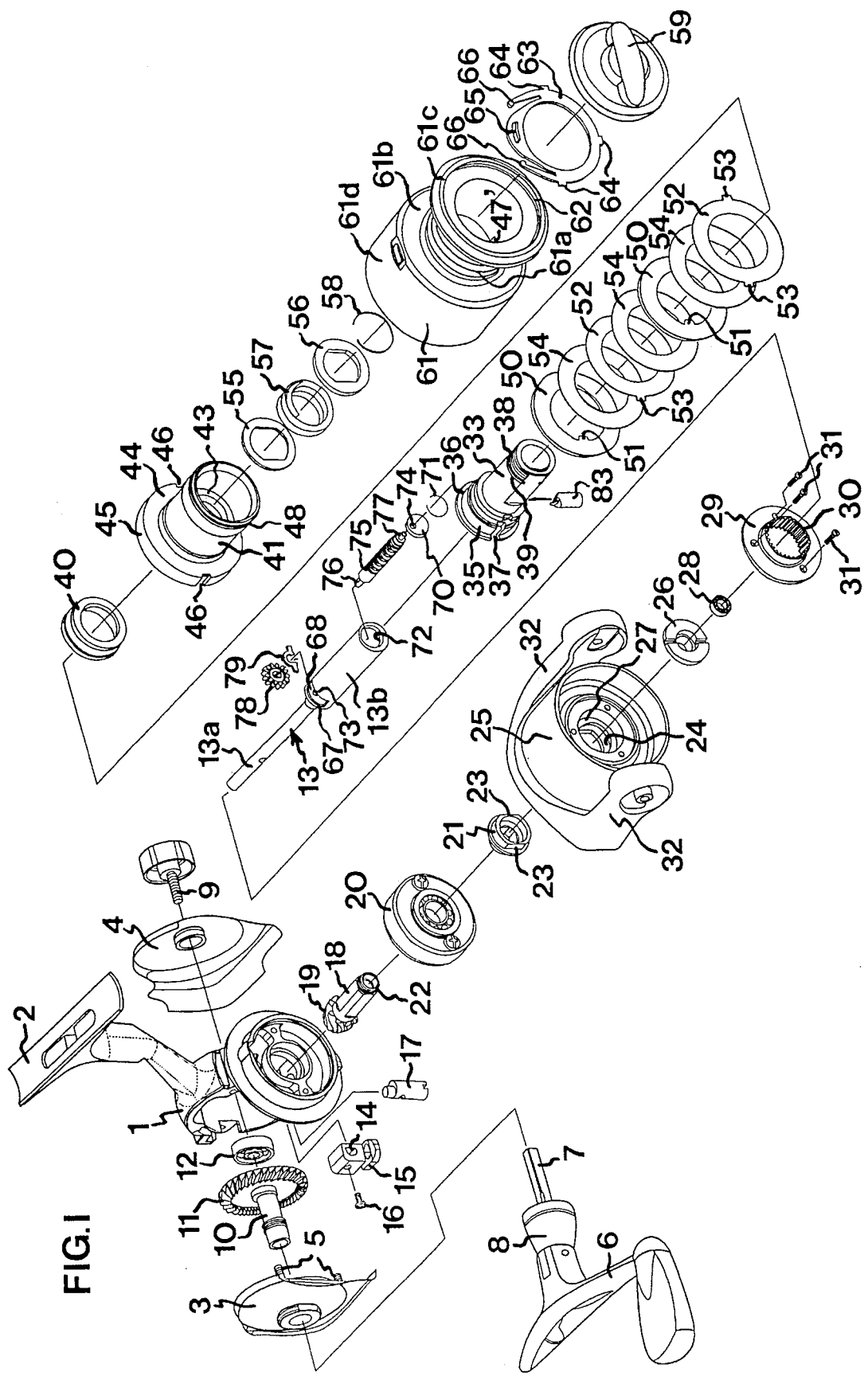
FIG. 1 is an exploded view illustrating an open-face fishing reel of the fixed-spool type according to the present invention.

The open-face fishing reel of the fixed-spool type shown in FIG. 1 comprises a housing 1 with a foot 2 for fixing the fishing reel to a fishing rod. The housing 1 comprises two side plates 3 and 4, which are attached to the main part of the housing by means of screws 5. A handle 6 is rotatably mounted in the housing 1. The shaft 7 of the handle 6 is axially fixed by means of a shoulder 8 on the handle side and by means of a screw 9 having a knob-shaped head on the opposite side. The screw 9 is screwed into a threaded axial bore at the free end of the shaft 7. The shaft 7 is of square cross-section over the major part of its length and nonrotatably supports a gear drive 10 which has axially directed teeth 11 on its side facing the handle side. The gear drive 10 is rotatably mounted in the housing 1 by means of a ball bearing 12.

It should be noted that "forwards", "backwards", "front" and "rear" in the specification and in the accompanying claims are used with reference to the position of the fishing reel when, mounted on a fishing rod, used by an angler. The direction forwards thus is the direction to the right in FIG. 2.

A spindle element 13 has a rear spindle member 13a which is mounted in the housing 1 and projects forwardly therefrom, and a front spindle member 13b integrated with the rear spindle member 13a and positioned in front of the housing 1. The rear spindle member 13a extends through a hole 14 in an adjusting slide 15 which is included in a mechanism for adjusting the axial position of the rear spindle member 13a and, thus, the entire spindle element 13 relative to the housing 1. The hole 14 formed in the slide 15 and having the same cross-sectional shape as the rear spindle member 13a has on one side a planar boundary wall (see FIG. 1) and therefore holds the rear spindle member 13a non-rotatable in the slide 15. The spindle element 13 is axially fixed in the slide 15 by means of a locking screw 16. The adjusting mechanism also comprises a turnable eccentric 17 for shifting the slide 15 and, thus, the spindle element 13. The adjusting mechanism is not included in the actual invention and will therefore not be described in detail here.

The rear spindle member 13a of the spindle element 13 also extends through a rotor shaft 18 which is rotatably mounted on the rear spindle member 13a. The rotor shaft 18 supports at its rear end a gear wheel 19 which is non-rotatably connected therewith and meshes with the teeth 11 of the gear drive 10. The rotor shaft 18 has two pairs of diametrically opposed planar surfaces (of which only one in each pair is to be seen in FIG. 1) and extends through an anti-reverse unit 20 which is not part of the invention and will therefore not be described in detail here, and through a distance sleeve 21, whose through hole is of a cross-section corresponding to the cross-sectional shape of the rotor shaft 18 and which is therefore non-rotatably supported on the rotor shaft 18. The rotor shaft 18 has an external thread 22 at its front end.

The distance sleeve 21 has, in its front portion, two diametrically opposed planar surfaces 23 and extends with this portion into a through hole 24 in a rotor 25. The hole 24 has in its rear part the same cross-sectional shape as the front portion of the distance sleeve 21, and so the rotor 25 is non-rotatably supported on the rotor shaft 18. A nut 26 is screwed on the thread 22 of the rotor shaft 18 and abuts against a circumferential shoulder 27 formed in the front part of the hole 24, said front part being of circular cross-section. Thus, the rotor 25 is axially fixed between the distance sleeve 21 and the nut 26. A ball bearing 28 is arranged between the nut 26 and the rear spindle member 13a. A gear rim 29 with internal teeth 30 is non-rotatably connected to the rotor 25 by means of screws 31.

The rotor 25 is substantially in the shape of a cylinder and supports two diametrically opposed arms 32 which are integrated with the rotor and extend axially along the rotor at a radial distance therefrom. The arms 32 constitute mountings for a pivotable winding-up bail (not shown) which is of a known design and therefore will not be described in more detail here.

A hollow line spool shaft 33 is non-rotatably connected, in a manner described in more detail below, to the front spindle member 13b of the spindle element 13. The hollow shaft 33 has a through bore 34, the diameter of which is equal to the diameter of the front spindle member 13b. The shaft 33 has a rear portion 35, whose outer diameter is greater than that of the rest of the shaft. This rear portion 35 consists of a circumferential front shoulder 35a and a circumferential rear shoulder 35b which has a greater diameter than the front shoulder. The rear shoulder 35b has a circumferential, radially projecting rear end flange 36. Two diametrically opposed, axially directed slits 37 (of which only one is to be seen in FIG. 1) extend along the rear shoulder 35b and through the end flange 36 thereof. The shaft 33 has an external thread 38 at its front end and an external circumferential groove 39 just behind this thread. Two planar surfaces (of which only one is to be seen in FIG. 1) are formed diametrically opposite each other in the front portion of the shaft 33, thereby forming a flat.

A rear bearing sleeve 40 is arranged on the front shoulder 35a of the rear shaft portion 35 and is held nonrotatable thereon with press fit.

An inner sleeve member 41, which in its central portion has a circumferential, internal shoulder 42 and accommodates a front bearing sleeve 43, which with press fit is pressed into the inner sleeve member 41 into abutment against the shoulder 42, is rotatably mounted on the shaft 33 by means of the bearing sleeves 40 and 43. The inner sleeve member 41 has, in its rear portion, a circumferential, radially projecting flange 44 and, projecting backwards a short distance therefrom, a cylindrical portion 45. The cylindrical portion 45 has two diametrically opposed slits 46 extending axially into the cylindrical portion 45 from the rear edge thereof. The inner sleeve member 41 has, immediately in front of the flange 44, a radially projecting pin 47 and has, in its front portion, an external circumferential groove 48.

A line spool drag 49 comprises two drag washers 50, which have two diametrically opposed, radially inwardly directed projections 51 and are non-rotatably connected to the shaft 33 by these projections 51 engaging in the slits 37 in the rear portion 35 of the shaft, two drag washers 52 which have two diametrically opposed, radially outwardly directed projections 53 and are non-rotatably connected to the inner sleeve member 41 by these projections 53 engaging in the slits 46 in the cylindrical portion 45, and three friction washers 54. The line spool drag 49 is composed of two groups of washers, each group comprising a drag washer 50 non-rotatably connected to the shaft 33, a drag washer 52 non-rotatably connected to the inner sleeve member 41, and an intermediate friction washer 54, as well as of a friction washer 54 arranged between the two groups. The line spool drag 49 is provided between the rear end flange 36 of the shaft 33 and the flange 44 of the inner sleeve member 41, thereby producing an adjustable braking effect between the shaft 33 and the inner sleeve member 41, the adjustability being described in more detail below.

A rear and a front supporting ring 55 and 56, respectively, whose central hole has a shape corresponding to the cross-sectional shape of the shaft 33 in the front portion thereof formed with the planar surfaces (the flat), are nonrotatably mounted on the shaft 33 in said portion. The rear supporting ring 55 abuts against the front side of the front bearing sleeve 43. A compression spring 57 is provided on the shaft 33 between the two supporting rings 55 and 56. A snap ring 58 is arranged in the circumferential groove 39 of the shaft 33 for preventing the front supporting ring 56 and thus the compression spring 57 and the rear supporting ring 55 and thus also the front bearing sleeve 43 and the inner sleeve member 41 from being drawn off the shaft 33.

A buzz mechanism (not shown), which has axially projecting resilient tongues, can be provided between the two bearing sleeves 40 and 43, the resilient tongues engaging with front teeth (not shown) on the rear bearing sleeve 40 and rear teeth (not shown) on the front bearing sleeve 43 for producing a buzz sound when the inner sleeve member 41 is rotated around the shaft 33.

An adjusting knob 59 with an internally threaded sleeve portion 60 is screwed on the thread 38 of the shaft 33. The rear end of the knob 59, i.e. the free end of the sleeve portion 60, abuts against the front supporting ring 56. When the knob 59 is screwed further inwards, it presses the front supporting ring 56 backwards in order to press, via the compression spring 57, the rear supporting ring 55 and the front bearing sleeve 43, the inner sleeve member 41 backwards more forcefully. As a result, the washers 50, 52 and 54 of the line spool drag 49 are pressed together more firmly between the rear end flange 36 of the shaft 33 and the flange 44 of the inner sleeve member 41, such that the braking effect of the line spool drag 49 increases. Correspondingly, the braking effect of the line spool drag 49 decreases, when the knob 59 is screwed in the opposite direction, i.e. is moved to the right in FIG. 2.

An outer sleeve member 61, which has a central portion 61a, on which a line (not shown) is to be wound, two radially projecting end flanges 61b, 61c positioned on both sides of the central portion 61a, and a backwardly directed, cylindrical portion 61d reinforcing the rear end flange 61b, is passed over the inner sleeve member 41. The outer sleeve member 61 is non-rotatable relative to the inner sleeve member 41 by the projecting pin 47 thereof engaging in a corresponding recess 47' inside the outer sleeve member 61, when the rear end flange 61b thereof abuts against the flange 44 of the inner sleeve member 41. In this position, the cylindrical portion 61d of the outer sleeve member 61 extends backwards a distance over the rotor 25.

The front end flange 61c of the outer sleeve member 61 has an internal circumferential groove 62. A releasable locking element 63 in the form of a spring element engages both in this circumferential groove 62 and in the circumferential groove 48 in the front portion of the inner sleeve member 41. The locking element 63, which thus holds the outer sleeve member 61 axially fixed to the inner sleeve member 41, is resiliently releasable from the circumferential groove 48 of the inner sleeve member 41 in order to permit release of the outer sleeve member 61 from the inner sleeve member 41. The locking element 63 consists of a ring, whose inner diameter is slightly greater than the outer diameter of the inner sleeve member 41 in the front portion. The ring has three radially outwardly directed projections 64, which in the position shown in the drawings project laterally and downwards, a forwardly projecting, upper gripper lug 65, and two resilient arms 66 projecting substantially tangentially upwards. The projections 64 and the resilient arms 66 engage in the circumferential groove 62 of the outer sleeve member 61, the locking element 63 being pressed downwards by the resilient arms 66, such that its upper portion engages in the circumferential groove 48 of the inner sleeve member 41. When the locking element 63 is to be released, the lug 65 is pressed upwards, whereby the locking element is raised, against the spring action of the arms 66, out of its engagement with the circumferential groove 48 of the inner sleeve member 41, such that the outer sleeve member 61 can be drawn off the inner one.

When one wants to fish with a line spool, whose central portion has a different depth or whose end flanges are designed in a different manner, or if one wants to easily replace the fishing line by a new fishing line of a different thickness, the adjusting knob 59 is screwed off from the shaft 33, whereupon the locking element 63 is released from the circumferential groove 48 of the inner sleeve member 41. The outer sleeve member 61 is then drawn off the inner sleeve member 41 and replaced by a new outer sleeve member, which has the desired shape and carries a line of the desired thickness. When the new outer sleeve member reaches the position shown in FIG. 2, its locking element snaps into the circumferential groove 48 of the inner sleeve member 41. After that, the adjusting knob 59 is screwed on again.

The front spindle member 13b of the spindle element 13 has the shape of a circular sleeve and is defined against the rear spindle member 13a by a rear end wall 67. The front spindle member 13b has a recess 68, which is formed just in front of the rear end wall 67, and a longitudinal slit 69 formed substantially diametrically opposite the recess 68 and extending along the major part of the length of the front spindle member 13b (see FIG. 2). The front spindle member 13b is closed at its front end by means of a disk 70 which is inserted therein and forms a front end wall and is kept in position by means of a snap ring 71 engaging in an inner circumferential groove 72 at the front end of the front spindle member 13b. A hole 73 is formed in the rear end wall 67, and a hole 74 is formed in the front end wall or the disk 70 flush with the hole 73. The two holes 73 and 74 are eccentrically positioned by being radially offset relative to the axis of the sleeve bore of the front spindle member 13b in the direction of the side where the recess 68 is formed. This axis is, in turn, radially offset in the same direction relative to the axis of the cylinder defining the outer limitation of the circular sleeve. As shown in the drawings, this results in a greater thickness of the material in that portion of the sleeve-shaped front spindle member 13b where the slit 69 is formed, than in the diametrically opposed portion where the recess 68 is formed.

A screw 75 is rotatably mounted in the front spindle member 13b by means of a rear journal 76 which is mounted in the hole 73 in the rear end wall 67, and a front journal 77 which is mounted in the hole 74 in the front end wall or disk 70. The rear journal 76 has two diametrically opposed planar surfaces forming a flat, thereby non-rotatably supporting just opposite the recess 68 a gear wheel 78, whose central hole has a cross-sectional shape corresponding to the cross-sectional shape of the rear journal 76 adjacent the flat. The gear wheel 78 is retained in its position just opposite the recess 68 by means of a retaining yoke 79. The gear wheel 78 extends through the recess 68 and meshes with the teeth 30 of the gear rim 29. The screw 75 is a so-called endless screw and has an endless thread groove 80 extending helically in one direction and returning helically in the other direction.

The line spool shaft 33 has a radial through hole 81 in its rear portion 35. A bushing 82 is inserted into the hole 81 and extends into the sleeve-shaped front spindle member 13b via the slit 69 thereof, whose width is substantially equal to the outer diameter of the bushing 82. As a result, the line spool shaft 33 is non-rotatably connected to the front spindle member 13b. A groove-follower pin 83 has a cylindrical portion 84 which is rotatably arranged in the bushing 82, and a blade-shaped portion 85 having substantially the same width as the endless thread groove 80 of the screw 75 and engaging therein. The groove-follower pin 83 is retained in the bushing 82 by the rear bearing sleeve 40.

When rotating the handle 6 in the retrieving direction, i.e. in the direction in which a fishing line (not shown) attached to the outer sleeve member 61 is retrieved, the gear drive 10 is rotated in order to, by meshing with the gear wheel 19, rotate the rotor shaft 18, such that the rotor 25 and thus the winding-up bail (not shown) supported by the rotor arms 32 are rotated. Consequently, the fishing line is wound up on the line spool formed of the two sleeve members 41 and 61. As the rotor 25 rotates, also the gear rim 29 rotates, which by meshing with the gear wheel 78 then also rotates the endless screw 75. By the rotation of the screw 75, an axial oscillating motion is imparted to the groove-follower pin 83 engaging in the thread groove 80, and thus also to the line spool shaft 33 and the line spool 41, 61, which results in the line being evenly spread over the line spool 41, 61. By the endless screw 75 being positioned inside the front spindle member 13b, a compact fishing reel is provided.

What I claim and desire to secure by Letters Patent:

1. An open-face fishing reel of the fixed-spool type, comprising a housing;

a spindle element having a rear spindle member which is non-rotatably mounted in the housing, and a sleeve-shaped front spindle member connected to the rear spindle member and positioned in front of the housing, said front spindle member having a longitudinal slit and a rear recess;

a hollow rotor shaft which is rotatably mounted on the rear spindle member and supports a first gear wheel nonrotatably connected to the rotor shaft;

a drive shaft mounted in the housing;

a handle for rotating the drive shaft;

a gear drive which is non-rotatably arranged on the drive shaft and meshes with the first gear wheel for rotating the rotor shaft on rotation of the drive shaft;

a rotor non-rotatably mounted on the rotor shaft and supporting a toothed element which is rotatable with the rotor shaft and the rotor;

an endless screw which is rotatably arranged in the sleeve-shaped front spindle member and supports a second gear wheel which is non-rotatably connected to the endless screw and which, via the rear recess in the front spindle member, meshes with the toothed element supported by the rotor, thereby rotating the endless screw as the rotor rotates;

a hollow line spool shaft non-rotatably arranged on the front spindle member;

a line spool rotatably mounted on the line spool shaft; and a groove-follower pin connected to the line spool shaft and, via the slit in the front spindle member, engaging with the endless screw to move, on rotation thereof, the line spool shaft and the line spool back and forth along the front spindle member.

2. A fishing reel as claimed in claim 1, wherein the slit and the rear recess in the front spindle member of the spindle element are formed substantially diametrically opposite each other, the endless screw being eccentrically arranged in the front spindle member radially offset towards the side where the rear recess is formed.

3. A fishing reel as claimed in claim 2, wherein the toothed element supported by the rotor is a gear rim nonrotatably connected to the rotor and having internal teeth.

4. A fishing reel as claimed in claim 1, wherein the hollow line spool shaft has a radial through hole in which the groove-follower pin is placed.

5. A fishing reel as claimed in claim 4, wherein the groove-follower pin has a cylindrical portion which is rotatably arranged in the radial through hole of the line spool shaft, and a blade-shaped portion having substantially the same width as the endless thread groove of the endless screw and engaging therein.

* * * * *